United States Patent
Löbmann et al.

(10) Patent No.: US 6,403,161 B1
(45) Date of Patent: Jun. 11, 2002

(54) PROCESS FOR DEPOSITING LAYERS OF ZIRCONIUM OXIDE USING SOLUBLE POWDERS

(75) Inventors: Peer Löbmann, Wurzburg; Walther Glaubitt, Veitshöchheim; Dieter Sporn, Wurzburg, all of (DE)

(73) Assignee: Fraunhofer-Gesellschaft zur Forderung der Angewandten Forschung e.V., Munich (DE)

( * ) Notice: Subject to any disclaimer, the term of this patent is extended or adjusted under 35 U.S.C. 154(b) by 0 days.

(21) Appl. No.: 09/648,339

(22) Filed: Aug. 25, 2000

(30) Foreign Application Priority Data

Sep. 13, 1999 (DE) .......................................... 199 43 789

(51) Int. Cl.7 ................................................ B05D 3/02
(52) U.S. Cl. .................................. 427/376.2; 427/126.3
(58) Field of Search ............................ 427/376.2, 126.3

(56) References Cited

U.S. PATENT DOCUMENTS

| | | | | |
|---|---|---|---|---|
| 4,753,915 A | * | 6/1988 | Vogt et al. ................... | 502/304 |
| 5,049,371 A | * | 9/1991 | Rinn et al. ................... | 423/592 |
| 5,238,625 A | * | 8/1993 | Sakurai et al. ................ | 264/56 |
| 5,256,615 A | * | 10/1993 | Oomura et al. ............... | 502/62 |
| 5,478,611 A | * | 12/1995 | Hashimoto ..................... | 428/1 |
| 5,585,136 A | * | 12/1996 | Barrow et al. ............. | 427/2.24 |
| 5,611,848 A | * | 3/1997 | Sasaki et al. .............. | 106/38.2 |
| 6,086,665 A | * | 7/2000 | Kamisawa et al. .... | 106/287.18 |

* cited by examiner

Primary Examiner—Michael Barr
(74) Attorney, Agent, or Firm—Paul A. Lesko; Thompson Coburn LLP

(57) ABSTRACT

A sol-gel process for producing layers of zirconium oxide is described which comprises the following stages:
  (i) production of a soluble, zirconium-containing powder by:
    (a) reaction of a zirconium alcoholate of the general formula $Zr(OR)_4$, in which the residues R are the same or different and represent straight-chain, branched or cyclic alkyl or alkenyl residues with 1 to 10 carbon atoms, which optionally exhibit one or more carbonyl and/or ester and/or carboxyl functions, with one or more polar compounds having complexing, chelating properties,
    (b) heating the solution,
    (c) mixing the solution with water, optionally in the presence of a catalyst,
    (d) concentrating the solution until a powder is obtained,
  (ii) dissolving the powder forming a sol,
  (iii) coating a substrate with the sol, and
  (iv) annealing the coated substrate.

15 Claims, No Drawings

PROCESS FOR DEPOSITING LAYERS OF ZIRCONIUM OXIDE USING SOLUBLE POWDERS

This patent application claims the benefit of priority under 35 U.S.C. § 119 of German Patent Application No. 199 43 789.0, filed Sep. 13, 1999. German Patent Application No. 199 43 789.0 is incorporated herein in its entirety by reference.

Process for depositing layers of zirconium oxide using soluble powders

The invention relates to a process for depositing layers of zirconium oxide ($ZrO_2$) on arbitrary substrates. In particular, the invention relates to a sol-gel process in which a soluble powder that can be redissolved in many solvents and solvent mixtures is firstly produced. The coating solution that is produced from the powder can be used in the production of, inter alia, layers of zirconium oxide on arbitrary substrates.

Technical interest in $ZrO_2$ layers is principally aimed at the use thereof as anti-corrosive layers for steel at high temperatures or in relation to aggressive media. This is described in, for example, R. Di Maggio, P. Scardi and A. Tomasi, Material Engineering, 5,1 13–23 (1994); M. Atik and M. A. Aegerter, Mat. Res. Soc. Symp. Proc. Vol. 271 (1992) and M. Anast, J. M. Bell, T. J. Bell and B. Ben-Nissan, J. Mat. Sci. Let. 11 (1992).

In comparison with physical or physicochemical methods of deposition, such as sputtering, vaporisation, chemical vapour deposition and metal-organic decomposition, wet chemical production via the sol-gel process offers a wealth of advantages: no costly items of coating equipment incorporating vacuum technology are required, large areas can be coated easily, and the inside of cylindrical substrates is also readily accessible to coating solutions. In comparison with classical oxide-ceramic processes the necessary process temperatures are low, permitting the coating of metals or glass substrates. Such processes are described in Sol-Gel Science, The Physics and Chemistry of Sol-Gel Processing (Academic Press, Boston, 1990), for example.

Coating solutions that are employed in the sol-gel process are produced, as a rule, from metal alcoholates and transition-metal alcoholates. Since these compounds are not resistant to hydrolysis, their storability under normal conditions is limited. Chemical modification of the alkoxides by means of complexing agents also does not always result in a stabilisation of the solutions that is satisfactory for industrial applications.

One object underlying the invention is therefore to make available a process for depositing layers of zirconium oxide that does not exhibit the aforementioned disadvantages. A further object underlying the invention is to make available a process for the deposition of $ZrO_2$ that enables deposition with a layer thickness of over 150 nm within one coating step. At the same time, the process is to permit the extensive coating of substrates of differing composition (various glasses, ceramic substrates, steel) and of variable geometry (flat specimens, tubes).

The invention provides a process for producing layers of zirconium oxide that comprises the following stages:
(i) production of a soluble, zirconium-containing powder by:
  (a) reaction of a zirconium alcoholate of the general formula $Zr(OR)_4$, in which the residues R are the same or different and represent straight-chain, branched or cyclic alkyl or alkenyl residues with 1 to 10 carbon atoms, which optionally exhibit one or more carbonyl and/or ester and/or carboxyl functions, with one or more polar compounds having complexing, chelating properties,
  (b) heating the solution,
  (c) mixing the solution with water, optionally in the presence of a catalyst,
  (d) concentrating the solution until a powder is obtained,
(ii) dissolving the powder forming a sol,
(iii) coating a substrate with the sol, and
(iv) annealing the coated substrate.

According to a preferred embodiment of this process, zirconium alcoholates of the general formula $Zr(OR)_4$ are employed in which R stands for a straight-chain or branched alkyl residue with 2 to 6 carbon atoms. Furthermore it is preferred if one or more OR residues of the aforementioned formula are derived from oxo esters, β-diketones, carboxylic acids, ketocarboxylic acids or keto alcohols. It is particularly preferred if the OR residue is derived from acetylacetone. Examples of suitable zirconium alcoholates are $Zr(OEt)_4$, $Zr(Oi-Pr)_4$, $Zr(On-Pr)_4$ and $Zr(AcAc)_2(Oi-Pr)_2$.

Instead of synthesising a coating solution directly, in accordance with the invention a soluble zirconium-containing powder is firstly produced. In this connection a zirconium alcoholate is caused to react with a polar, complexing and chelating compound. Such compounds are, for example, diketones, β-keto esters, acetylacetone, glycol ethers, diols, polyhydric alcohols, amino alcohols, glycerol, hydroxydiols, aminothiols, dithiols, diamines or mixtures of the same.

Particularly preferred is the use of diketones, in particular 1,3-diketones such as acetylacetone.

With the process according to the invention the polar complexing and chelating compound is employed in a quantity from 0.5 to 20 mol, preferably 0.5 to 3 mol, per mol zirconium alcoholate.

After reaction of the zirconium alcoholate with the polar complexing and chelating compound, the solution that is obtained is heated to a temperature in the range from room temperature to the boiling-point of the solvent, preferably to 80 to 100° C., over a time-interval of up to 24 hours, preferably over a time-interval from 0.5 to 2 hours.

Subsequently the solution is heated with a quantity from 0.5 to 20, preferably 1 to 3, mol $H_2O$ per mol zirconium alcoholate, optionally in the presence of a catalyst ($H_3O^+$, $OH^{31}$) or with dilute inorganic or organic acids or lyes such as $HNO_3$, HCl, NaOH or $NH_3$, or with dilute solutions of metallic salts such as $NaBF_4$, and the mixture is concentrated, preferably under reduced pressure. With this process a pulverulent solid is obtained which has a zirconium content from 30 to 55% by weight.

The powder according to the invention is capable of being stored in contact with air for an unlimited period.

The powder according to the invention can be redissolved in numerous solvents or solvent mixtures and can consequently be used for producing a coating solution for the deposition of layers of zirconium oxide, said coating solution also being a subject of the invention. Suitable solvents are alcohols, diols, diol ethers, amines, water and mixtures thereof. Through the choice of the solvents or solvent mixtures it is possible for important properties of the coating solution, such as solids content and viscosity, to be adjusted selectively and to be matched to the coating process and the substrate.

Suitable alcohols are aliphatic alcohols, in particular methanol, ethanol, isopropanol and butanol.

Suitable diol ethers are, e.g., methoxyethanol, butoxyethanol or isopropoxyethanol.

Suitable diols are those of the general formula $HO(CH_2)_nOH$ in which n stands for an integer from 2 to 8, such as, e.g., ethanediol, propanediol, butanediol etc. Polyhydric alcohols or polyols such as, e.g., glycerin can also be employed in the process according to the invention.

Suitable amines are monoalkylamines, dialkylamines or trialkylamines, the alkyl groups of which may optionally be substituted by one or more OH groups. Preferred amines have the general formula $NR_xR'_{3-x}$, in which R and R' may be the same or different and may stand for methyl, ethyl, hydroxyethyl and hydrogen and x signifies an integer from 0 to 3.

The-coating solutions according to the invention preferably contain water.

Quite particularly preferred are coating solutions that contain, by way of solvent, a mixture of propanediol, triethanolamine and water, the best results being achieved with coating solutions that contain the aforementioned solvents in a weight ratio of 60:10:30 with a solids content of 15% zirconium oxide.

Also preferred are coating solutions that contain, by way of solvent, a mixture of 1.5-pentanediol and ethanol, the best results being achieved with coating solutions that contain the aforementioned solvents in a weight ratio from 5/95 to 45/55 with a solids content of the sol amounting to 5-10% by weight with respect to $ZrO_2$.

With a view to producing the coating solution according to the invention, the solvent or solvent mixture is mixed with the zirconium-containing powder. In this connection the solvent is preferably submitted and the powder is added in portions.

Subsequently the mixture is heated to a temperature in the range from room temperature to the boiling-point of the solvent mixture, preferably in the range from 80 to 100° C., over a time-interval from 10 to 60 minutes, resulting in a colloidal solution (sol).

By addition of silicon alcoholates to the $ZrO_2$ sols that have been produced in this way it is possible for the refractive index of the thin layers to be freely chosen in the range between 1.5 and 2.1. The preferred ratio of zirconium alcoholate to silicon alcoholate amounts to 9:91. Suitable silicon alcoholates which can be admixed are silicon alcoholates of the general formula $Si(OR)_4$, in which the residues R are the same or different and represent straight-chain, branched-chain or cyclic alkyl or alkenyl residues with 1 to 10 carbon atoms, which optionally exhibit one or more carbonyl and/or ester and/or carboxyl functions.

Preferred silicon alcoholates are $Si(OEt)_4$ and $Si(OMe)_4$.

Depending on the mixing ratio of zirconium-containing powder to solvent or solvent mixture, the zirconium-oxide content of the sol amounts to 0.1 to 30%, preferably to about 15% (percent by mass).

A large number of substrate types can be wetted very well by the sols according to the invention. By single coating and subsequent annealing at a temperature of 550° C. it is possible for $ZrO_2$ layers with a thickness of up to 0.8 μm to be deposited, depending on the coating process. Suitable coating processes are known as such to those skilled in the art and are described in Sol-Gel Science, The Physics and Chemistry of Sol-Gel Processing, Academic Press (1990), for example.

Surprisingly, no step for drying the wet film is necessary when use is made of the coating solution according to the invention prior to thermal age-hardening. In the case of layer thicknesses above 0.4 μm the layers exhibit a reticular fissured structure. Surprisingly, these layers exhibit good adhesion even on borosilicate glass.

If auxiliary substances such as polyethylene glycol are added to the coating solutions, it is possible for fine structures to be impressed into the layers (cf. N. Toghe et al., J. Non-Cryst. Solids, 100 (1988), 501).

Moreover, it is possible to introduce doping into the layers of zirconium oxide by introducing appropriate components into the solvent or solvent mixture in the course of production of the coating solution according to the invention. Such components are, for example, compounds of yttrium that are soluble in the solvent mixtures.

A significant advantage of the process according to the invention, and also of the zirconium-containing powder that is used in this process and of the coating solution that is produced therefrom, can be seen in the fact that the powder has a high solids content with respect to $ZrO_2$ and is capable of being stored in contact with air for an unlimited period. The powder dissolves very easily in residue-free manner in numerous solvents and solvent mixtures. Many sol properties that are essential for the coating process can be adjusted selectively through the choice of the solvent or solvent mixture, without the synthesis of the powder having to be changed. In addition, the layer thicknesses that can be obtained with a single coating are very considerable.

The invention is elucidated in more detail by means of the following Examples:

APPLICATION EXAMPLE 1

Powder Synthesis 100 g acetylacetone are added dropwise to 436 g zirconium-n-propylate (75-%) subject to stirring. The solution is heated for one hour to 80° C. After the addition of 54 g of de-ionised water the charge is concentrated at the rotary evaporator at reduced pressure. This results in a pulverulent, yellowy-red solid with a zirconium-oxide content of 40% by mass.

APPLICATION EXAMPLE 2

Sol Production 185 g of the powder are added in fairly small portions to 356 g of a solvent mixture of propanediol, triethanolamine and water in a mass ratio of 60:10:30. A clear sol results after heating for one hour to 50° C. The zirconium-oxide content amounts to 15% by mass.

APPLICATION EXAMPLE 3

Layer Preparation

The coating sols can also be deposited on the inside of tube-type substrates by the bottom being sealed with a pierced stopper, by the sol being poured in, and by a well-defined wet film being left behind on the substrate as a result of drainage or evacuation by pumping. Astonishingly, in the case of internal coatings of tubes it is possible for better results to be achieved at higher pumping-evacuation rates than in the case of the coating of flat specimens.

In this connection the sol is poured into a vertically oriented borosilicate tube, the lower opening of which has been sealed with a pierced stopper. As a result of evacuation by pumping, a lowering of the liquid level is obtained. The resulting layer thickness is capable of being adjusted by means of the pumping-evacuation rate; at 16 mm/min, ceramic layers with a thickness of 0.6 μm are obtained. Directly after the coating, the tube is heated to 550° C. for 30 minutes in a circulating-air oven.

What is claimed is:

1. A sol-gel process for producing layers of zirconium oxide, characterised in that it comprises the following stages:
   (i) production of a soluble, zirconium-containing powder by:
      (a) reaction of a zirconium alcoholate of the general formula $Zr(OR)_4$, in which the residues R are the same or different and represent straight-chain, branched or cyclic alkyl or alkenyl residues with 1 to 10 carbon atoms, with one or more polar compounds having complexing chelating properties,
      (b) heating the solution,
      (c) mixing the solution with water,
      (d) concentrating the solution until a powder is obtained,
   (ii) dissolving the powder forming a sol,
   (iii) coating a substrate with the sol, and
   (iv) annealing the coated substrate.

2. Process according to claim 1, wherein said polar compounds having complexing, chelating properties are selected from the group consisting of diketones, β-keto esters, acetylacetone, glycol ethers, diols, polyhydric alcohols, amino alcohols, glycerol, hydroxydiols, aminothiols, dithiols, diamines and mixtures of the same.

3. Process according to claim 2 wherein said polar compound having complexing, chelating properties comprises acetylacetone and said zirconium alcoholate comprises zirconium-n-propylate.

4. Process of claim 1, characterised in that the zirconium-containing powder is dissolved in a solvent selected from the group consisting of alcohols, diols, diol ethers, amines, water and mixtures thereof.

5. Process according to claim 4 wherein said solvent comprises a mixture of propanediol, triethanolamine and water.

6. Process according to claim 1, wherein the substrate is selected from the group consisting of glass, ceramic, and metal substrates and mixtures thereof.

7. Process according to claim 6 wherein the substrate comprises borosilicate glass.

8. Process according to claim 1 wherein the substrate is selected from the group consisting of a flat specimen and a tube.

9. Process according to claim 1, characterised in that auxiliary substances are added to the sol.

10. The process of claim 1 wherein said R residues exhibit one or more carbonyl and/or ester and/or carboxyl groups.

11. The process of claim 1 wherein said mixing of water occurs in the presence of a catalyst.

12. Process according to claim 9 wherein said auxiliary substances comprise polyethylene glycols.

13. Use of a coating solution derived from a zirconium-containing powder for the production of layers of thickness over 150 nm, said use comprising preparing said zirconium-containing powder by (a) reacting a zirconium alcoholate with a diketone, (b) heating the solution, (c) mixing the solution with water and (d) concentrating the solution until a powder is obtained; said coating solution selected from the group consisting of a colloidal solution of said zirconium-containing powder in an alcohol, in a diol, in an amine, in water and in mixtures thereof,
   dissolving said powder into said coating solution,
   and depositing said coating solution as a wet film on the substrate by pouring said solution onto the substrate and allowing said coating solution to drain from said substrate.

14. Use of the coating solution according to claim 13 for the production of a film thickness of over 150 nm.

15. The use of claim 13 wherein said mixing the solution with water occurs in the presence of a catalyst.

* * * * *